(12) United States Patent  
Guerin et al.

(10) Patent No.: US 8,150,027 B2  
(45) Date of Patent: Apr. 3, 2012

(54) CONTROL OF ECHO CANCELLATION FILTERS

(75) Inventors: Alexandre Guerin, Rennes (FR); Jean-Luc Garcia, Issy-les-Moulineaux (FR)

(73) Assignee: France Telecom, Paris (FR)

(*) Notice: Subject to any disclaimer, the term of this patent is extended or adjusted under 35 U.S.C. 154(b) by 1137 days.

(21) Appl. No.: 12/004,489

(22) Filed: Dec. 21, 2007

(65) Prior Publication Data

US 2008/0159552 A1    Jul. 3, 2008

(30) Foreign Application Priority Data

Dec. 28, 2006 (FR) ...................................... 06 11485

(51) Int. Cl.
 *H04M 9/08* (2006.01)
(52) U.S. Cl. ................................ 379/406.03; 379/406.04
(58) Field of Classification Search ............. 379/406.03, 379/406.04
See application file for complete search history.

(56) References Cited

U.S. PATENT DOCUMENTS

| | | | | | |
|---|---|---|---|---|---|
| 4,922,530 | A | * | 5/1990 | Kenney et al. | ........... 379/406.09 |
| 5,014,263 | A | * | 5/1991 | Vairavan et al. | ............... 370/290 |
| 6,108,413 | A | | 8/2000 | Capman et al. | |
| 6,507,653 | B1 | * | 1/2003 | Romesburg | .............. 379/406.05 |
| 6,570,986 | B1 | | 5/2003 | Wu et al. | |
| 2004/0161101 | A1 | | 8/2004 | Yiu et al. | |

FOREIGN PATENT DOCUMENTS

EP        0 854 626        7/1998

* cited by examiner

*Primary Examiner* — Alexander Jamal  
(74) *Attorney, Agent, or Firm* — McKenna Long & Aldridge LLP

(57) ABSTRACT

Coefficients of an adaptive filter representative of an acoustic channel between an emitted acoustic signal and a microphone signal are determined and smoothed in time. An echo is then estimated by filtering the emitted acoustic signal with the smoothed coefficients. Properties of the estimated echo and of the microphone signal are estimated. The echo cancellation filter is controlled as a function of a comparison between the properties of the estimated echo and those of the microphone signal so as to take into account the potential presence of a signal other than an echo signal in the microphone signal.

21 Claims, 4 Drawing Sheets

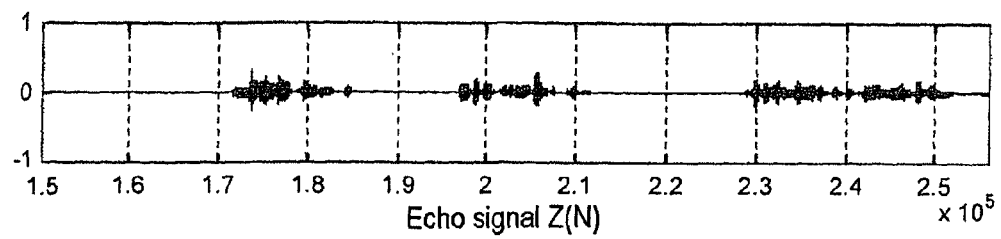
FIG. 5A — Echo signal Z(N)
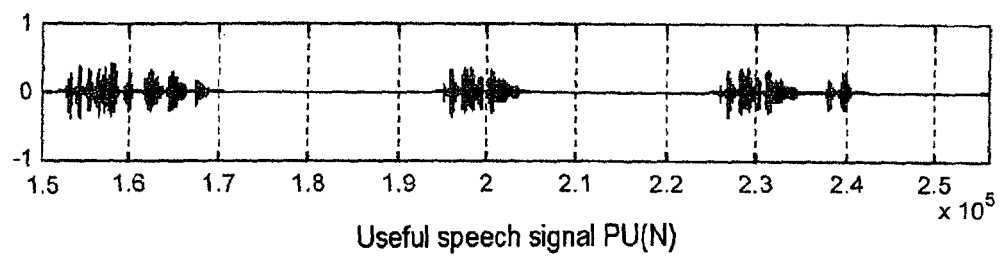
FIG. 5B — Useful speech signal PU(N)
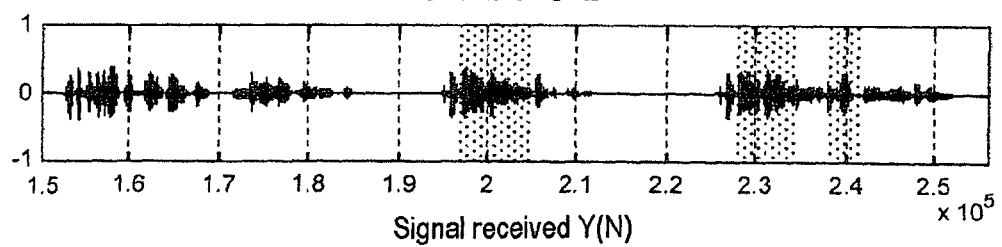
FIG. 5C — Signal received Y(N)
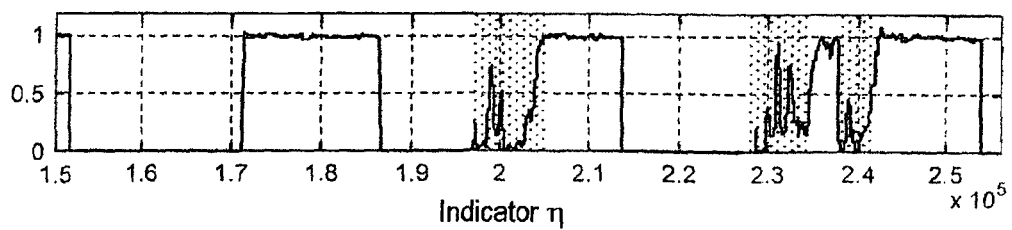
FIG. 5D — Indicator η

CONTROL OF ECHO CANCELLATION FILTERS

This application claims priority from French Application FR 06 11485, filed Dec. 28, 2006, which is hereby incorporated by reference in its entirety.

BACKGROUND OF THE INVENTION

The present invention relates to the control of echo cancellation filters.

In numerous communication systems and equipment, a problem arises with echo, that is to say situations in which an acoustic signal is emitted and simultaneously, totally or partially acquired, and then played back to the initial emitter in the form of an echo.

This type of situation occurs during communications implementing equipment comprising a loudspeaker for emitting an acoustic signal and a microphone situated within range of the loudspeaker such as compact or "hands-free" type equipment. On account of the proximity between the loudspeaker and the microphone, the microphone is liable to acquire the signal emitted by the loudspeaker. Thus, a distant talker hears his own voice delayed by the lag introduced by the communication chain.

In order to alleviate this problem, the terminals use echo cancellation filters. In a general manner, an echo is estimated on the basis of the signal emitted and is deducted from the microphone signal.

In practice, this is often carried out by adaptive filters applied to the microphone signal. In a general manner, adaptive filtering consists in giving an expression for the evolution of coefficients of the filter over time, this expression having to meet a convergence criterion. Several algorithms are used in echo cancellation such as, for example, the so-called LMS (Least Mean Square) or NLMS (Normalized LMS) algorithms or other algorithms that are well known to a person skilled in the art and described in particular in the document by Simon S. Haykin, "*Adaptive Filter Theory*", Prentice Hall (September 2001).

In order to suitably filter the echo and not to introduce distortion in the signal played back, it is necessary to control the echo cancellation filters differently when there is an echo and when there is not. More precisely, it is necessary to permit modifications of the parameters of the filters solely in an echo-only period and it is necessary to avoid modifying the parameters of the filters in situations where there is no echo as well as in the so-called double-talk situations, that is to say cases where the microphone signal comprises an echo component and a useful signal component.

The discrimination of these situations is a complex problem. Indeed, it is relatively simple to detect periods of echo absence on account of the absence of signal on the loudspeaker but, it is very difficult to distinguish echo-only situations from double-talk situations. Now, the performance of the adaptive echo cancellation algorithms depends very strongly on the capacity to distinguish these phases.

Existing solutions are based on comparing between properties of the signal emitted and the same properties evaluated on the microphone signal.

An example of a conventional system is represented with reference to FIG. 1 in which a terminal 2 is schematically represented. Acoustic signals are conveyed to this terminal in a conventional manner, for example, by Hertzian wave or with the aid of any appropriate communication network.

The terminal receives a signal x(n) from the network such as a speech signal. This signal x(n) is broadcast on a loudspeaker 6. The signal emitted by the loudspeaker 6 is transformed by the acoustic channel H corresponding to the environment of the terminal 2.

In the terminal 2, a microphone 8 records the local signal y(n), composed of a useful signal pu(n) corresponding for example to the speech signal emitted by a talker, added with a part of the sound emitted by the loudspeaker: the acoustic echo. This echo is the result of the convolution of the signal broadcast by the loudspeaker 6 with the acoustic channel H and depends on the dimensions of the terminal, the materials used, the environment and other parameters.

The signal y(n) acquired by the microphone 8 is then returned to an adaptive echo cancellation filter 10. This filter 10 is used to generate an estimated echo $\hat{z}(n)$ which is deducted from the microphone signal in a mixer 12.

In the example described, the terminal 2 comprises a conventional feedback loop from the mixer 12 so that the coefficients of the filter 10 are modified in such as way as to decrease the difference between the echo and the microphone signal.

The adaptive filter 10 is denoted $\hat{H}_L$ and is a filter of length L, whose coefficients $\{\hat{h}_i(n)\}_{i=0,\ldots,L-1}$ are adapted over time and indexed by the temporal index n. This filter generates the pseudo-echo $\hat{z}(n)$. The residual echo e(n) results from subtracting $\hat{z}(n)$ from the microphone signal y(n) in the mixer 12. We then have the following expressions:

$$\hat{z}(n) = \sum_{i=0}^{L-1} \hat{h}_i(n) \times (n-i)$$

$$e(n) = y(n) - \hat{z}(n)$$

In the example, a so-called LMS algorithm is used with as criterion the minimization of the power of the residual echo according to the following equation:

$$\hat{H}_L(n) = \hat{H}_L(n-1) + \mu \cdot e(n) \cdot X(n)$$

In this equation $\hat{H}_L(n) = [\hat{h}_0(n), \hat{h}_1(n), \ldots, \hat{h}_{L-1}(n)]^T$ is the vector of the L coefficients of the adaptive filter of the instant n, and $X(n) = [x(n), x(n-1), \ldots, x(n-L+1)]^T$ is the vector of the last L samples of the signal emitted to the loudspeaker 6. The term $\mu$ is a factor called the "adaptation step size" which controls the speed of convergence.

The role of $\mu$ is important in controlling the stability of the filter. In the echo-only situations, the filter may be adapted in such a way as to converge speedily. In the absence of an echo, the adaptation of the coefficients is not desirable since this may lead to mismatch of the adaptive filter, and finally to perceptible rises in echo. Likewise, as soon as the local talker is active, whether it be in a speech-only or double-talk situation, it is appropriate to freeze the adaptation of the echo cancellation filter 10.

In the converse case, the filter 10 seeks to suppress the useful speech and becomes maladapted. In addition to the risks of filter divergence, this leads to strong degradations of the useful signal and to the reappearance of echo, or even to its amplification.

The terminal 2 also comprises a module 14 for controlling the filter 10, also called the double-talk detection module or DTD. This module 14 analyses the signals x(n) and y(n) so as to extract a decision which makes it possible to freeze the adaptation of the filter 10, in particular in a period of double-talk.

The system described with reference to FIG. 1 uses a direct comparison of the signals emitted and received. This does not however allow optimal control on account of the modifications induced by the acoustic channel H.

In order to improve the detection of double-talk situations, certain methods of controlling adaptive echo cancellation filters analyse the properties of the channel. Such is the case in particular for the document P. Ahgren, "On system identification and acoustic echo cancellation", Thesis UPPSALA Universitet (April 2004) which uses two filters $\hat{H}_L^1$ and $\hat{H}_L^2$. A diagram of such a system is represented in FIG. 2.

In this figure, the elements similar to those described with reference to FIG. 1 bear the same reference numerals. Depicted are the terminal 2 with the adaptive filter 10 and the mixer 12 as well as the loudspeaker 6 and the microphone 8, separated by the acoustic channel H.

In this embodiment, the double-talk detection module 14 is also depicted. The terminal 2 comprises however a second adaptive filter 16. The filter 10 is situated upstream of the double-talk detection module 14 whereas the filter 16 is situated downstream of the module 14, with respect to the direction of processing of the microphone signal.

The filter 10 is continuously adapted by virtue of the use of a negative feedback loop implemented in a conventional manner to reduce the residual calculated by the mixer 12 between the pseudo-echo and the microphone signal.

The filter 16 is also adapted according to a feedback loop, this adaptation being driven by the decision of the double-talk detection module 14. If the module 14 detects the presence of local speech, it may be decided, for example, to freeze the filter 16 or any other soft decision making it possible to slow down the adaptation according to the degree of probability of the presence of local speech. It is the filter 16 which serves to estimate the echo $\hat{z}_2(n)$ which is then subtracted from the microphone signal by a mixer 18.

In an echo-only period, when the acoustic channel H does not vary abruptly, the evolution of the coefficients of the filter 10 slows down in tandem with the convergence of the coefficients. As soon as double-talk is present, the coefficients of the filter 10, which is continuously adapted, are greatly modified by the presence of useful speech.

When these coefficients vary quickly and strongly, the probability of being in a double-talk situation is considerable.

For reasons of simplicity of implementation, the variance is calculated only for the largest value of the coefficients of the adaptive filter $\hat{H}_L^1$:

$$\gamma = \max_{h_i^1}(h_i^1, \ldots h_L^1)/$$

where $h_i^1$ signifies that these are the coefficients of the continuously adapted filter 10. This document proposes to compare the variance of $\gamma$ with a fixed threshold. Thus, in the presence of echo, a strong variance signals the presence of a useful speech signal, and consequently, a potential double-talk period. Therefore, the coefficients $h_i^1$ of the filter 10 are no longer copied over to the second filter 16 whose evolution is frozen.

Such a system does not however make it possible to differentiate between a variation of the acoustic channel and the appearance of a double-talk situation. These phenomena have the same impact on the evolution of the coefficients of the adaptive filter 16 that is used to calculate the pseudo-echo which is subtracted from the microphone signal.

Thus, the existing methods and systems are not entirely satisfactory as regards the control of echo cancellation filters in particular, owing to the imperfect detection of double-talk situations.

An object of the invention is to improve this situation by virtue of a method and a device for controlling echo cancellation filters.

SUMMARY OF THE INVENTION

A method of controlling an echo cancellation filter is proposed, comprising:
- determining coefficients of an adaptive filter representative of an acoustic channel between an acoustic signal emitted and a microphone signal
- temporal smoothing of the coefficients of said adaptive filter;
- determining an estimated echo by filtering the acoustic signal emitted with said smoothed coefficients;
- estimating properties of said estimated echo;
- estimating the same properties on the microphone signal;
- comparing between said properties of the estimated echo and said properties of the microphone signal so as to evaluate the presence of a signal other than an echo signal in the microphone signal; and
- controlling the filter for cancelling an echo in the microphone signal, as a function of said comparison.

The use of properties of the estimated echo allows a more relevant analysis for evaluating the presence of an echo and the presence of a signal other than an echo signal and therefore makes it possible to detect the potential situations of double-talk.

Furthermore, the method compares the signals emitted and received while taking account of the acoustic channel.

The method also makes it possible to obtain directly the estimation of the acoustic channel and the smoothing of the variations over time of this channel renders the method robust to fast variations of the acoustic channel.

In a particular embodiment, the said estimating of properties of the estimated echo and the said estimating of properties of the microphone signal each comprise an auto-regressive modelling. The use of an auto-regressive model makes it possible to track the evolution of the signals in an effective manner.

Advantageously, the auto-regressive modelling of the microphone signal comprises the application, to the microphone signal, of the parameters of the auto-regressive modelling of the estimated echo. Thus, it is not necessary to undertake the identification of the parameters of the AR model of the microphone signal and the comparison of the properties is done by evaluating the relevance of the model of the estimated echo applied to the microphone signal.

In a particular embodiment, the said estimating of properties of the estimated echo furthermore comprises the determining of a prediction residual arising from a prediction of the estimated echo by the corresponding auto-regressive model and the said estimating of properties of the microphone signal furthermore comprises the determining of a prediction residual arising from a prediction of the microphone signal by the auto-regressive model. These residuals are thus directly comparable and make it possible to characterize the similitude between the estimated echo and the microphone signal. For example, the degree of similitude may be evaluated by comparing the energies of the prediction residuals.

In a variant, the comparing of the properties of the estimated echo and the properties of the microphone signal comprises the forming of an indicator representing the probability that the microphone signal comprises solely an echo signal corresponding to the signal emitted. This indicator thus makes it possible to detect the potential periods of double-talk.

Advantageously, the said controlling of a cancellation filter comprises the supervising of the variations of the said filter as a function of the presence of a signal other than the echo signal in the microphone signal. This makes it possible in particular to freeze the adaptive filters in the event of potential double-talk.

The invention also provides a corresponding program as well as a device for controlling an echo cancellation filter and a system as well as a terminal comprising such a device.

BRIEF DESCRIPTION OF THE DRAWINGS

FIGS. 5A to 5D represent the evolution of certain signals in the course of the method of the invention.

DESCRIPTION OF EMBODIMENTS

Figure 3:
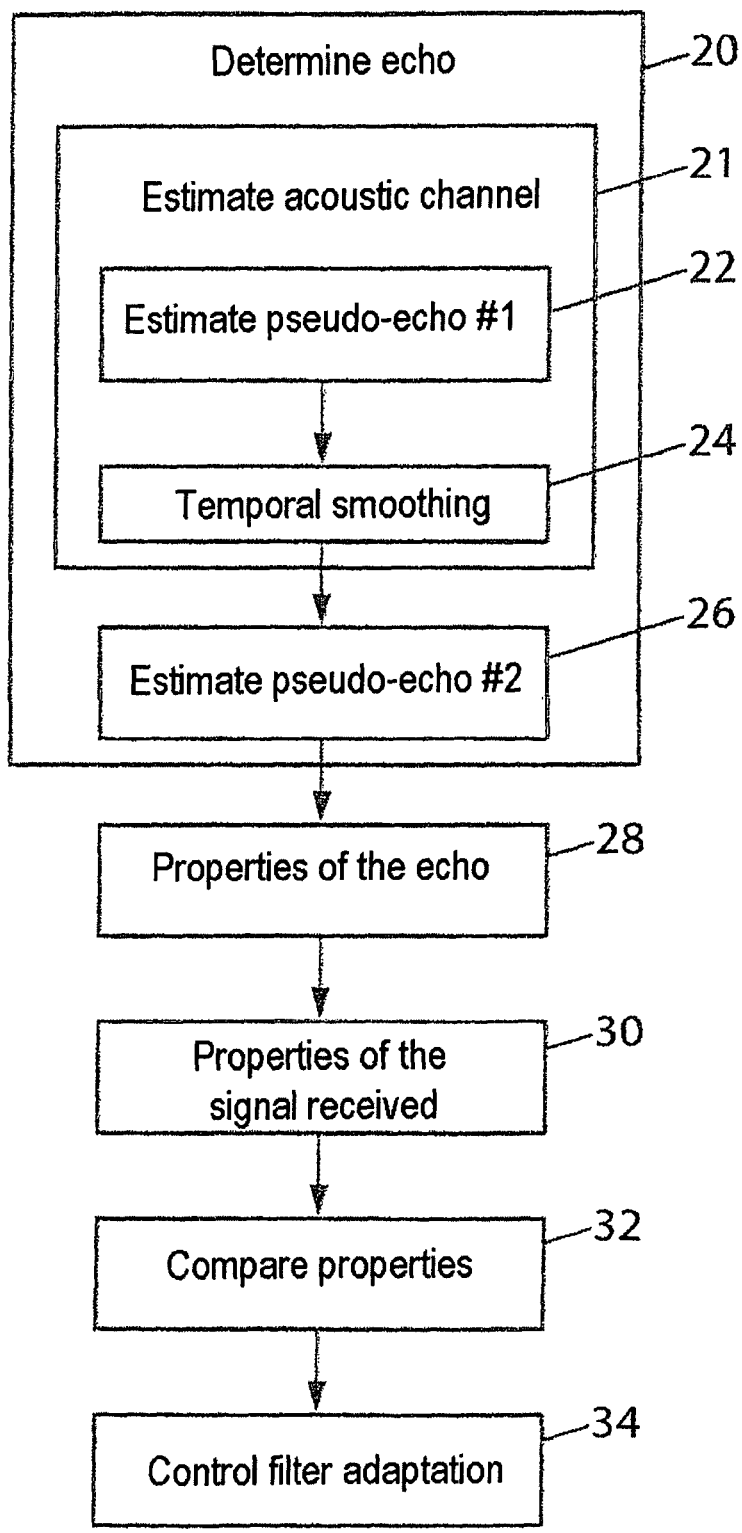
FIG. 3 is a flowchart of a method according to the invention.

With reference to FIG. 3, the method of the invention will now be described in a general manner.

This method is implemented at the level of a terminal emitting an acoustic signal x(n) through a loudspeaker. This terminal also receives another acoustic signal y(n), termed the microphone signal or received signal, and liable to comprise an echo of the acoustic signal emitted.

The method begins with a step 20 of determining an estimated echo which comprises an estimation 21 of the acoustic channel H.

In the embodiment described, the step 21 comprises an estimation 22 of a first pseudo-echo on the basis of the acoustic signal emitted x(n). This estimation 22 comprises, for example, the application of an adaptive filter to the signal emitted and the modification of the parameters of this filter by a negative feedback loop. The negative feedback loop is implemented in a conventional manner, on the basis of the microphone signal, so as to reduce the residual between the microphone signal and the pseudo-echo.

The estimation 22 thus makes it possible to obtain a first estimation of the acoustic channel H by way of the coefficients of the adaptive filter.

The estimation 22 is followed by the estimation of the mean acoustic channel, that is to say of a temporal smoothing 24 of the variations of the coefficients of the adaptive filter. Thus, on completion of step 22, an evaluation of the mean acoustic channel is available.

The method continues with an estimation 26 of a second pseudo-echo, carried out on the basis of the acoustic signal emitted and the time-smoothed coefficients of the first adaptive filter.

More precisely, this second pseudo-echo is obtained by applying the filter consisting of the smoothed coefficients to the emitted signal x(n). An echo calculated with a time-smoothed estimation of the acoustic channel H is thus obtained.

The method then comprises a step 28 of estimating properties of the second pseudo-echo as well as a step 30 of estimating the same properties on the microphone signal. In the embodiment described, the properties used are acoustic properties obtained by auto-regressive models.

The properties of the second pseudo-echo and of the microphone signal are compared in the course of a step 32 so as to form an indicator of the probability that the situation is a pure-echo situation, that is to say that the microphone signal comprises an echo component only. This indicator is used to control an echo cancellation filter during a step 34.

Figure 4:
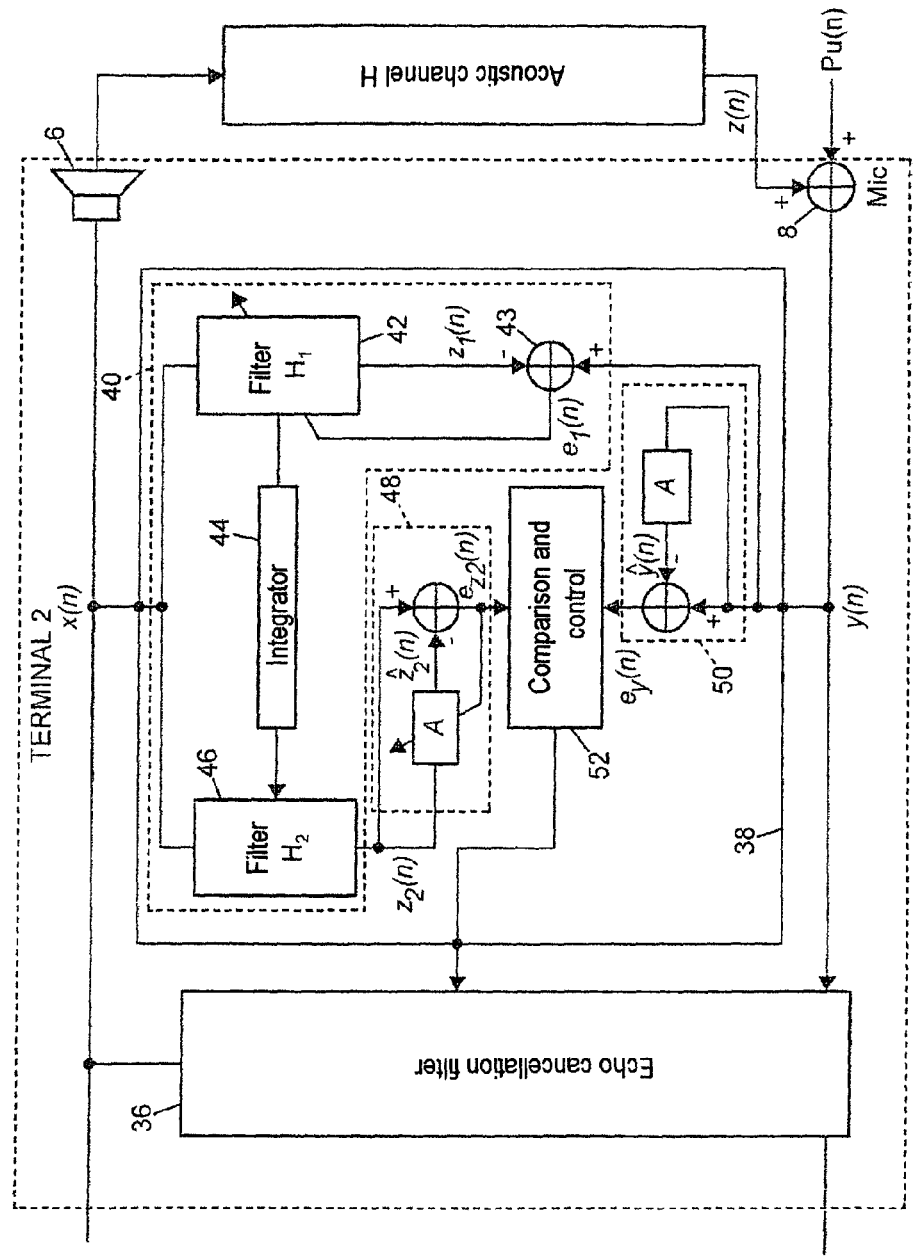
FIG. 4 is a diagram of a device according to the invention.

With reference to FIG. 4, the details of a device implementing the method of the invention will now be described.

Figure 1:
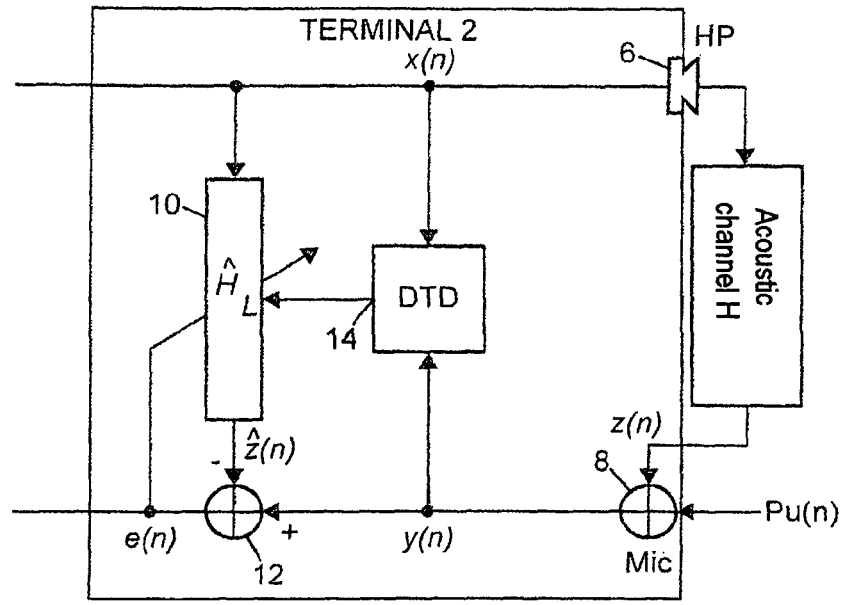
FIGS. 1 and 2, already commented on, represent diagrams of devices of the prior art.
Figure 2:
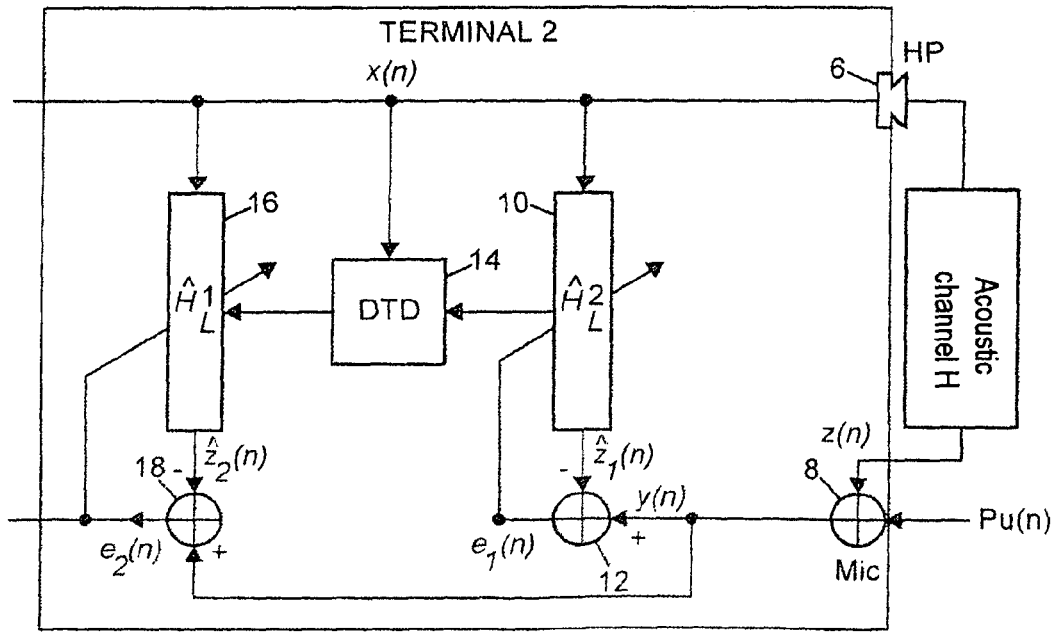

As in the cases described with reference to FIGS. 1 and 2, this device or terminal 2 comprises the loudspeaker 6 separated from the microphone 8 by the acoustic channel H.

Furthermore, the terminal 2 comprises an echo cancellation filter 36 receiving as input the emitted signal x(n) as well as the received signal y(n).

The terminal comprises a module 38 for controlling the echo cancellation filter, or double-talk detection module (DTD).

This module 38 comprises a unit 40 for determining an estimated echo which receives as input the signal emitted x(n) destined for the loudspeaker 6 as well as the microphone signal y(n) acquired by the microphone 8.

In the embodiment described, the unit 40 comprises firstly an estimator 42 of the first pseudo-echo implementing the step 22 described previously. This estimator 42 carries out an adaptive filtering the aim of which is to estimate the transfer function of the acoustic channel H and to track its variations over time. Its implementation relies on an adaptive algorithm of conventional type such as a so-called LMS (Least Mean Square) or NLMS (Normalized LMS) algorithm, an APA (Affine Projection Algorithm) or any other equivalent algorithm.

Advantageously, the estimator 42 comprises a feedback loop aimed at reducing the difference between the microphone signal y(n) and the first pseudo-echo. This difference is called the residual echo and is calculated by a mixer 43 in a conventional manner.

In this implementation, the adaptive algorithm chosen for the estimator 42 is an NLMS, whose adaptation equation is the following, with the same notation as previously:

$$H_1(n+1) = H_1(n) + \mu \cdot \frac{X(n)}{X(n)^T X(n)} \cdot e_1(n).$$

Thus, a first pseudo-echo $z_1(n)$ is generated by filtering the emitted signal x(n) with the adapted filter $H_1$. As indicated previously in respect of adaptive filters in general, $H_1(n) = [h_{1,0}(n), h_{1,1}(n), \ldots, h_{1,L-1}(n)]^T$ denotes the vector of the L coefficients of the filter H1 at the instant n. Consequently, the pseudo-echo is expressed by:

$$z_1(n) = \sum_{i=0}^{L-1} h_{1,i}(n) \times (n-i).$$

The residual echo $e_1(n)$ delivered by the mixer 43 is equal to the microphone signal from which the pseudo-echo is subtracted:

$$e_1(n) = y(n) - z_1(n).$$

Advantageously, the management of the adaptation of the filter of the estimator 42 involves an expression for a variable adaptation step size μ which makes it possible to manage the adaptation of the filter. Thus, this technique proposes that the convergence term μ be made to evolve in an interval [$\mu_{min}$, $\mu_{max}$] as a function of the energy levels of the emitted signal x(n) and of the microphone signal y(n) and according to the following behaviour:

$\mu(n) \to \mu_{max}$ in an echo-only period, so as to make $\hat{H}_L$ converge, $\mu(n) \to \mu_{min}$ in a useful speech-only phase, so as to stabilize $\hat{H}_L$, $\mu(n) \in [\mu_{min}, \mu_{max}]$ in a double-talk phase. It is necessary that $\mu(n) \to \mu_{min}$ if the useful speech is predominant relative to the echo and that $\mu(n) \to \mu_{max}$ in the converse case.

To define an expression which satisfies these trends, it is appropriate to make the assumption according to which the energy of the echo is globally lower than the energy of the useful speech. An expression for $\mu$ which satisfies the desired behaviour is defined below, where (a,b,c) are parameters which depend on the properties of the terminal. The power of the signal considered at the instant n is denoted $\sigma^2(n)$. Thus $\mu$ is expressed by:

$$\mu(n) = \frac{a \cdot \sigma_{HP}^2(n)}{b \cdot \sigma_{HP}^2(n) + c \cdot \sigma_{Micro}^2(n)}$$

As long as the hypothesized assumption holds, the contribution of the echo in $\sigma_{Micro}^2$ is small relative to that of the useful speech and this expression makes it possible to obtain the desired behaviour.

In a double-talk situation, the adaptation of the filter H1 must be disabled and the term $\mu$ is fixed at 0.

Of course, other adaptation management laws are also possible such as those described in the document P. Scalart, P. Duhamel and A. Benamar, Process and device for adaptive identification and adaptive echo canceller relating thereto, U.S. Pat. No. 5,734,715 (March 1998).

The unit 40 also comprises an integrator 44 which implements the temporal smoothing step 24.

This integrator 44 carries out a temporal smoothing of the coefficients of the filter of the estimator 42. Specifically, for a given acoustic configuration, it is considered that the majority of the energy due to the acoustic coupling originates from the direct path between the loudspeaker 6 and the microphone 8 as well as the first reflections related to the structure of the terminal. Consequently, these modifications, which correspond to the acoustic channel H, are relatively stable.

Also, when the filter H1 of the estimator 42 is undergoing adaptation, its coefficients evolve a great deal when it starts from a maladapted state so as to attain the adapted state, and evolve very little when the filter has converged.

The smoothing makes it possible to obtain filtering coefficients corresponding to an estimation of the acoustic channel H that is less sensitive to disturbances than that obtained by the coefficients of the filter H1, in particular upon the appearance of speech at the level of the terminal which causes mismatch of the coefficients of the echo cancellation filter.

In the example, this temporal smoothing is obtained through the following recursive expression:

$$H_2(n) = \alpha \cdot H_2(n-1) + (1-\alpha) H_1(n)$$

The smoothing quantity $\alpha$ is chosen constant and equal to $\alpha = 0.96$. This value is judged sufficient to ensure a compromise between the tracking of the variations of the acoustic channel and the occurrences of double-talk.

Of course, the temporal integration is not limited to this exponential smoothing and other expressions may be used.

The estimator 42 and the integrator 44 thus deliver an estimation of the mean acoustic channel, implementing step 21 of the method described previously.

The smoothed coefficients are used in a filter H2 of an estimator 46 to form a second pseudo-echo which implements step 26 described previously.

This estimator 46 generates, on the basis of the filter H2 $H_2(n) = [h_{2,0}(n), h_{2,1}(n), \ldots, h_{2,L-1}(n)]^T$ whose coefficients are smoothed, the second pseudo-echo $z_2(n)$ according to the following expression:

$$z_2(n) = \sum_{i=0}^{L-1} h_{2,i}(n) \times (n-i)$$

The second pseudo-echo $z_2(n)$ forms the output of the unit 40, that is to say the estimated echo for the emitted signal x(n).

Next, the module 38 comprises a unit 48 for estimating properties of the second pseudo-echo, such as spectral envelope properties.

The unit 48 implements step 28 described previously and comprises, in the example, a calculation of an auto-regressive model, termed an AR model which makes it possible to estimate the spectral envelope of the signal. Alternatively, the unit 28 implements a calculation of the fundamental frequency of the second pseudo-echo or any other procedure making it possible to extract a property specific to the second pseudo-echo.

These properties being determined on the basis of the pseudo-echo and not on the basis of the emitted signal x(n), they take account of the estimation of the acoustic channel H. More precisely, these properties take account of the estimation of the spectral coloration of the acoustic signal.

Furthermore, the use of two pseudo-echoes makes it possible to dispense with instantaneous modifications and to obtain a robust estimation of the acoustic channel even during spikes of high power.

In the example, the unit 48 calculates an AR model of order P of the second pseudo-echo $z_2(n)$ according to the following equation:

$$e_{z2}(n) = z_2(n) - \sum_{i=1}^{P} \alpha_i z_2(n-i)$$

$e_{z2}(n)$ is the prediction residual, and the coefficients $(\alpha_i)_{1 \leq i \leq P}$ are calculated with the aim of minimizing the power $E\{e_{z2}(n)^2\}$ of $e_{z2}(n)$.

In the case where $z_2(n)$ is a speech signal, it is at best stationary over short periods of a few tens of milliseconds. The coefficients $(\alpha_i)_{1 \leq i \leq P}$ must therefore be regularly updated. Several algorithms make it possible to calculate these coefficients, including adaptive filtering algorithms (LMS—NLMS or Block NLMS) or solving the Yule-Walker equation with the Levinson-Durbin algorithm. The so-called Block NLMS and Levinson-Durbin algorithms perform the calculation on frames during which the signal is assumed to be stationary. For example, the unit 48 uses the Levinson-Durbin algorithm on frames of 20 ms.

For a sampling frequency equal to 8000 Hz, it is accepted that an order p of less than 10 is generally sufficient to model the spectral envelope.

Thus, the signal $e_{z2}(n)$ and the coefficients $(a_i)_{1 \leq i \leq P}$ are both representative of the properties of the second pseudo-echo $z_2(n)$ and either one may be used. In the example, the signal $e_{z2}(n)$ is used.

Furthermore, the module 38 comprises a unit 50 for estimating the same properties on the microphone signal y(n).

This module 50 implements step 30 of the method described previously by performing, on the microphone signal, the same operations as those carried out by the module 48.

Insofar as the AR model calculated by the module 48 is representative of the spectral envelope of the estimated echo signal, an advantageous implementation consists in reusing this model so as to apply it to the signal y(n) as represented in FIG. 4. Thus, the module 50 delivers properties of the acoustic signal in the form of a residual $e_y(n)$ according to the following expression:

$$e_y(n) = y(n) - \sum_{i=1}^{P} a_i y(n-i).$$

Consequently, if the microphone signal y(n) contains echo only, the AR model will be well adapted and the residuals $e_{z2}(n)$ and $e_y(n)$ will be "comparable". On the other hand, if another signal, such as noise or useful speech, is added to the microphone signal, the AR model will not be adapted and the residuals will be "different".

The residuals $e_{z2}(n)$ and $e_y(n)$ are then transmitted to a unit 52 for comparison and control of the echo cancellation filter.

This unit 52 therefore receives as input the information representative of the properties of the second pseudo-echo and of the microphone signal so as to determine the probability of the presence of a useful signal, that is to say the probability that there is a signal other than an echo signal in the microphone signal.

When the microphone signal is composed of echo alone, the properties of the estimated echo and of the microphone signal are theoretically similar. On the other hand, in the presence of an additional signal at the level of the terminal, such as for example noise or useful speech to be transmitted, the properties calculated on the microphone signal are no longer comparable to those calculated on the second pseudo-echo.

Depending on the type of properties used, one or more analysis rules make it possible to determine whether a signal other than echo is present in the microphone signal. If such is the case, a period liable to be a double-talk period is detected. The unit 52 then controls the echo cancellation system so as, in particular, to freeze the adaptation of the echo cancellation filter 36 to avoid any maladaptation.

As indicated previously, in the example, the unit 52 takes as input the residual signals $e_{z2}(n)$ and $e_y(n)$ so as to determine the presence of double talk. In this implementation, the unit 52 is adapted for comparing the powers $E\{e_{z2}(n)^2\}$ and $E\{e_y(n)^2\}$ of these residuals. These quantities may be estimated in various ways and in particular, by exponential smoothing which is a technique that is inexpensive in terms of calculation time, according to the following equations:

Estimation of $E\{e_{z2}(n)^2\}$: $\sigma_{e_{z2}}^2(n) = \lambda \cdot \sigma_{e_{z2}}^2(n-1) + (1-\lambda) \cdot e_{z2}(n)^2$ Estimation of $E\{e_y(n)^2\}$: $\sigma_{e_y}^2(n) = \lambda \cdot \sigma_{e_y}^2(n-1) + (1-\lambda) \cdot e_y(n)^2$.

In these equations, $\lambda$ is taken close to 1, for example equal to $\lambda = 0.9961$, this corresponding, for a sampling frequency of 8000 Hz, to a time constant of 32 ms.

In an echo-only period, the powers of the two residual signals $e_{z2}(n)$ and $e_y(n)$ are comparable.

In a double-talk period, the echo signal spectral envelope, added to the useful speech signal, is different from that of the echo only. Also, the residual $e_y(n)$ contains energy in the zones that are not modelled by the AR model defined on the basis of the estimated echo, so that the power of $e_y(n)$ must be greater than that of $e_{z2}(n)$.

Thus, the comparison may be performed on the basis of the ratio η(n) between the powers $\sigma_{e_{z2}}^2(n)$ and $\sigma_{e_y}^2(n)$, the expression for which at the instant n is as follows:

$$\eta(n) = \frac{\sigma_{e_{z2}}^2(n)}{\sigma_{e_y}^2(n)}$$

A simple rule for comparing η(n) with a threshold T makes it possible to detect the periods that are liable to be double-talk periods, according to the following rule:

if η(n)<T ⇒ risk of double-talk else ⇒ absence of double-talk

The value of T may be fixed empirically and must be determined as a function of a tolerated false alarm rate. In this example, the detection threshold is fixed but an adaptive rule may be envisaged. It is also possible to envisage a system for maintaining the decision of risk of double-talk ("hangover") as is conventionally encountered in voice activity detectors.

Furthermore, a timeout makes it possible to short-circuit the control unit 52 during the first seconds of adaptation of the filter, so as to avoid freezing the adaptation. This timeout is active at the start of processing and after any supervising of the adaptive filter which involves setting the step size to zero or resetting the coefficients to zero.

The command is emitted by the unit 52 to the echo cancellation filter 36. This filter may be any type of filter requiring to be modified depending on whether or not the situation may be a double-talk situation. This filter may or may not be adaptive, and may or may not comprise a non linear processing.

In the example, when the module 52 has decided an absence of local speech, the coefficients H1 of the filter 42 which are continuously adapted are simply transmitted to the filter 36. Conversely, when the module 52 has detected a presence of local speech, the filter 36 is not updated and the values of its coefficients are frozen.

Of course, it is also possible to control the filter 36 otherwise and in particular to use an adaptive filter that is independent of the filters 42 and 46, whose adaptation is frozen or permitted according to the decision of the double-talk detection module 52.

FIGS. 5A to 5D represent results obtained by virtue of the method of FIG. 3 and the system of FIG. 4 within the framework of the acoustic echo cancellation applied to spoken communication.

The sampling frequency is 8000 Hz. The acoustic channel is known and of length 512 points, the adaptive filter 42 is of length L=256. The echo-to-noise ratio, that is to say the ratio of the power of the echo to the power of the useful speech, is of the order of −3 dB.

The curve of FIG. 5A represents the echo signal z(n), the curve of FIG. 5B represents the useful speech pu(n) and the curve of FIG. 5C represents the microphone signal y(n).

The curve represented in FIG. 5D represents the ratio η used to detect potential periods of double-talk. In FIGS. 5C and 5D, the hatched zones correspond to the double-talk periods.

The curve of FIG. 5D shows indeed that the quantity η is close to 1 in an echo-only period. In the periods in which echo is absent, the evolution of η is not important and has been masked in this representation. In a double-talk period, the quantity η decreases and becomes appreciably less than 1, readily making it possible to detect the presence of a signal other than the echo at the level of the terminal 2. Of course, the sensitivity of the system can be parameterized via the threshold. In this case, it is for example possible to choose a threshold value of 0.5, which entails setting the adaptation step size to zero during the double-talk periods:

if $\eta(n)<0.5 \Rightarrow$ potential double-talk else $\Rightarrow$ potential pure echo This criterion makes it possible to detect the most energetic potential zones of double-talk and therefore the ones that are most liable to give rise to divergence of the adaptive filter.

Of course, other embodiments are also possible. In particular, in a variant, the determination of the estimated echo implements a single adaptive filtering stage with no temporal smoothing. In this case, the properties of the estimated echo are evaluated directly on the output signal from the adaptive filter.

It is also possible to obtain the mean acoustic channel otherwise than by temporal smoothing. For example, it is possible to use the least squares procedure over a considerable time window to obtain an evaluation of the acoustic channels transfer function which is already averaged over time.

Moreover, the invention may be implemented by means of software or parts of software comprising code instructions which, when they are executed by a computer, give rise to the implementation of the method of the invention. Such software may in particular be stored in the memory of a microprocessor or of a digital signal processor (DSP).

It is also possible to use a dedicated component such as a programmed component intended to be integrated into a device such as a telephone.

The invention claimed is:

1. Method of controlling an echo cancellation filter comprising:
   determining coefficients of an adaptive filter representative of an acoustic channel between an emitted acoustic signal and a microphone signal;
   smoothing in time the coefficients of said adaptive filter;
   determining an estimated echo by filtering the emitted acoustic signal with the smoothed coefficients;
   estimating properties of said estimated echo;
   estimating the same properties on the microphone signal;
   comparing said properties of the estimated echo and said properties of the microphone signal so as to evaluate the presence of a signal other than an echo signal in the microphone signal; and
   controlling the echo cancellation filter for cancelling an echo in the microphone signal, as a function of the comparison;
   wherein the steps of estimating properties of the estimated echo and of estimating properties of the microphone signal each comprise an auto-regressive modeling.

2. Method according to claim 1, wherein the auto-regressive modeling of the microphone signal comprises applying parameters of the auto-regressive modeling of the estimated echo to the microphone signal.

3. Method according to claim 1, wherein the step of estimating properties of the estimated echo further comprises determining a prediction residual arising from a prediction of the estimated echo by the autoregressive model determined for said estimated echo, and the step of estimating properties of the microphone signal further comprises determining a prediction residual arising from a prediction of the microphone signal by the auto-regressive model determined for said microphone signal.

4. Method according to claim 1, wherein the step of comparing the properties of the estimated echo and the properties of the microphone signal comprises forming an indicator representing a probability that the microphone signal comprises only an echo signal corresponding to the emitted acoustic signal.

5. Method according to claim 1, wherein the step of controlling the echo cancellation filter comprises supervising variations of said echo cancellation filter as a function of the presence of a signal other than the echo signal in the microphone signal.

6. A computer program product for a device for controlling an echo cancellation filter, the program product comprising instructions or portions of instruction for controlling the following steps when executed by a computer of said device:
   determining coefficients of an adaptive filter representative of an acoustic channel between an emitted acoustic signal and a microphone signal;
   smoothing in time the coefficients of said adaptive filter;
   determining an estimated echo by filtering the emitted acoustic signal with the smoothed coefficients;
   estimating properties of said estimated echo;
   estimating the same properties on the microphone signal;
   comparing said properties of the estimated echo and said properties of the microphone signal so as to evaluate the presence of a signal other than an echo in the microphone signal; and
   controlling the echo cancellation filter for cancelling an echo in the microphone signal, as a function of the comparison;
   wherein the steps of estimating properties of the estimated echo and of estimating properties of the microphone signal each comprise an auto-regressive modeling.

7. A computer program product according to claim 6, wherein the auto-regressive modeling of the microphone signal comprises applying parameters of the autoregressive modeling of the estimated echo to the microphone signal.

8. A computer program product according to claim 6, wherein the step of estimating properties of the estimated echo further comprises determining a prediction residual arising from a prediction of the estimated echo by the auto-regressive model determined for said estimated echo, and the step of estimating properties of the microphone signal further comprises determining a prediction residual arising from a prediction of the microphone signal by the autoregressive model determined for said microphone signal.

9. A computer program product according to claim 6, wherein the step of comparing the properties of the estimated echo and the properties of the microphone signal comprises forming an indicator representing a probability that the microphone signal comprises only an echo signal corresponding to the emitted acoustic signal.

10. A computer program product according to claim 6, wherein the step of controlling the echo cancellation filter comprises supervising variations of said echo cancellation filter as a function of the presence of a signal other than the echo signal in the microphone signal.

11. Device for controlling an echo cancellation filter, comprising:
- means for determining coefficients of an adaptive filter representative of an acoustic channel between an emitted acoustic signal and a microphone signal;
- means for smoothing in time coefficients of said adaptive filter;
- means for determining an estimated echo by filtering the emitted acoustic signal with said smoothed coefficients;
- means for estimating properties of said estimated echo;
- means for estimating the same properties on the microphone signal;
- means for comparing said properties of the estimated echo and said properties of the microphone signal so as to evaluate the presence of a signal other than an echo signal in the microphone signal; and
- means for controlling the echo cancellation filter for the microphone signal as a function of said comparison;
- wherein the means for estimating properties of the estimated echo and the means for estimating properties of the microphone signal each implement auto-regressive modeling.

12. Device according to claim 11, wherein the autoregressive modeling of the microphone signal comprises applying parameters of the auto-regressive modeling of the estimated echo to the microphone signal.

13. Device according to 11, wherein the means for estimating properties of the estimated echo further comprise means for determining a prediction residual arising from a prediction of the estimated echo by the auto-regressive model determined for said estimated echo, and the means for estimating properties of the microphone signal further comprise means for determining a prediction residual arising from a prediction of the microphone signal by the autoregressive model determined for said microphone signal.

14. Device according to claim 11, wherein the means for comparing the properties of the estimated echo and the properties of the microphone signal comprise a generator of an indicator representing a probability that the microphone signal comprises only an echo signal corresponding to the emitted acoustic signal.

15. Device according to claim 11, wherein the means for controlling the echo cancellation filter are arranged to control variations of said echo cancellation filter as a function of the presence of a signal other than the echo signal in the microphone signal.

16. Communication system comprising at least one terminal having a loudspeaker for emitting an acoustic signal, a microphone for sensing a microphone signal, an echo cancellation filter for compensating an acoustic channel between the emitted acoustic signal and the microphone signal, and a device for controlling the echo cancellation filter, wherein the device for controlling the echo cancellation filter comprises:
- means for determining coefficients of an adaptive filter representative of an acoustic channel between the emitted acoustic signal and the microphone signal;
- means for smoothing in time coefficients of said adaptive filter;
- means for determining an estimated echo by filtering the emitted acoustic signal with said smoothed coefficients;
- means for estimating properties of said estimated echo;
- means for estimating the same properties on the microphone signal;
- means for comparing said properties of the estimated echo and said properties of the microphone signal so as to evaluate the presence of a signal other than an echo signal in the microphone signal; and
- means for controlling the echo cancellation filter for the microphone signal as a function of said comparison;
- wherein the means for estimating properties of the estimated echo and the means for estimating properties of the microphone signal each implement auto-regressive modeling.

17. A communication terminal, comprising a loudspeaker for emitting an acoustic signal, a microphone for sensing a microphone signal, an echo cancellation filter for compensating an acoustic channel between the emitted acoustic signal and the microphone signal, and
- a controller for the echo cancellation filter, wherein the controller comprises:
  - means for determining coefficients of an adaptive filter representative of an acoustic channel between the emitted acoustic signal and the microphone signal;
  - means for smoothing in time coefficients of said adaptive filter;
  - means for determining an estimated echo by filtering the emitted acoustic signal with said smoothed coefficients;
  - means for estimating properties of said estimated echo;
  - means for estimating the same properties on the microphone signal;
  - means for comparing said properties of the estimated echo and said properties of the microphone signal so as to evaluate the presence of a signal other than an echo signal in the microphone signal; and
  - means for controlling the echo cancellation filter for the microphone signal as a function of said comparison;
  - wherein the means for estimating properties of the estimated echo and the means for estimating properties of the microphone signal each implement auto-regressive modeling.

18. The communication terminal as claimed in claim 17, wherein the auto-regressive modeling of the microphone signal comprises applying parameters of the autoregressive modeling of the estimated echo to the microphone signal.

19. The communication terminal as claimed in claim 17, wherein the means for estimating properties of the estimated echo further comprise means for determining a prediction residual arising from a prediction of the estimated echo by the auto-regressive model determined for said estimated echo, and the means for estimating properties of the microphone signal further comprise means for determining a prediction residual arising from a prediction of the microphone signal by the auto-regressive model determined for said microphone signal.

20. The communication terminal as claimed in claim 17, wherein the means for comparing the properties of the estimated echo and the properties of the microphone signal comprise a generator of an indicator representing a probability that the microphone signal comprises only an echo signal corresponding to the emitted acoustic signal.

21. The communication terminal as claimed in claim 17, wherein the means for controlling the echo cancellation filter are arranged to control variations of said echo cancellation filter as a function of the presence of a signal other than the echo signal in the microphone signal.

* * * * *